United States Patent Office 3,514,487
Patented May 26, 1970

3,514,487
TELOMERS AND PROCESS FOR THE PREPARATION THEREOF
Louis G. Anello, Basking Ridge, Richard F. Sweeney, Dover, and Morton H. Litt, Morristown, N.J., assignors to Allied Chemical Corporation, New York, N.Y., a corporation of New York
No Drawing. Filed Apr. 25, 1967, Ser. No. 633,359
Int. Cl. C07c 43/00, 43/14
U.S. Cl. 260—614       31 Claims

ABSTRACT OF THE DISCLOSURE

Novel telomers of the formula

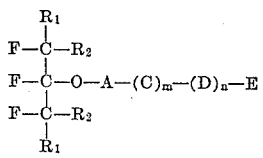

wherein $R_1$ and $R_2$ are Cl, F, alkyl, haloalkyl or alkylene and haloalkylene groups forming a cycloaliphatic structure, wherein E is I or Br and wherein C and D are bifunctional groups which may be derived from telomerizable acetylenically or ethylenically unsaturated compounds, and wherein $m$ is an integer from 1–75 and $n$ is an integer from 0–75 are prepared by radical addition reactions of polyhaloisoalkoxyalkyl halide telogens of the formula

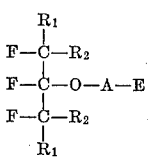

or dissimilar lower molecular weight telomers, with telomerizable unsaturated compounds. The telomerization reaction may be initiated by heat or by means of a free-radical initiating catalyst. The telogen starting materials may be prepared by reacting a corresponding halogenated ketone with an ionizable fluoride salt, e.g. CsF, to form a fluorinated organic salt and then reacting the organic salt with a halogen other than fluorine and an olefin. After telomerization the telomers may be stabilized by replacing the E iodine or bromine atom with a chlorine, fluorine or hydrogen atom. The indicated class of telogen starting materials have been found to be unusually reactive and telomerization employing said telogens provides an improved means for obtaining low molecular weight telomers having a desired specific molecular weight range. The novel telomers are useful as insulator and condenser fluids, hydraulic fluids, lubricants, heat transfer media and as intermediates in the preparation of useful surfactants and polyacrylate oil and stain repellent agents.

CROSS-REFERENCES TO RELATED APPLICATIONS (1) Copending application of Litt et al., entitled "Fluorinated Ethers," Ser. No. 492,276, filed Oct. 1, 1965.

(2) Copending application of Litt et al., entitled "Fluorinated Ethers," Ser. No. 513,574, filed Dec. 13, 1965.

(3) Copending application of Anello and Sweeney, entitled "Novel Sulfates and Method for Their Preparation," Ser. No. 633,368, filed Apr. 25, 1967.

BACKGROUND OF THE INVENTION

This invention relates to novel radical addition reactions of polyhaloisoalkoxyalkyl halides with unsaturated compounds and to the novel polymeric products produced thereby.

Liquid low molecular weight polymers, generally known as telomers, prepared by reaction of a telogen and an unsaturated compound, particularly one containing a high proportion of fluorine, are known to be flame resistant and to have superior thermal and chemical stability. However, many potentially desirable fluorocarbon monomers polymerize only under extremely vigorous conditions while, with still others, it has been impossible to obtain any polymerization at all. It has been proposed to overcome this difficulty by copolymerizing difficultly polymerizable monomers with a second monomer known to polymerize more readily. In such copolymerization reactions, however, extraneous molecules are introduced into the polymer chain, so that all of the desirable properties of the homopolymer are not realized.

A further obstacle to preparation of telomers, particularly telomers containing a high proportion of fluorine, which are capable of being prepared by the telomerization reaction, i.e. by reaction of a telogen and an unsaturated compound, resides in the difficulty of controlling the chain length of the telomers produced by this method. The telomerization of fluorocarbon monomers such as tetrafluoroethylene and various derivatives thereof to low molecular weight telomer halides is extremely difficult as a result of the low activation energy of the olefin propagation reaction in the telomerization reaction which is the primary route to higher molecular weight products. Accordingly, low molecular weight perfluoroalkyl iodide telogens, such as $CF_3I$, $C_2F_5I$ and $N-C_3F_7I$, which provide a high degree of thermal and chemical stability, must be used in extremely high molar ratios relative to the fluorocarbon monomer. This of necessity results in low conversions of the telogen to the desired telomer halide product. In addition, not only must large quantities of relatively expensive telogen be employed to produce a small quantity of desired telomer product but also tedious and expensive separatory procedures are involved in recovering the telomer product having the desired molecular weight range. Preparation of prior art telomers derived from polyfluoroalkyl halide telogens is disclosed in U.S. Pat. 3,083,238 to Hauptschein et al. and U.S. Pat. 3,145,222 to Brace.

One object of the present invention is to provide a method whereby unsaturated compounds, particularly ethylenically unsaturated compounds containing a high proportion of fluorine, hitherto considered difficult to polymerize, are readily telomerized to produce telomers having a higher molecular weight.

Another object is to provide a method for producing certain fluorinated telomers which is more readily controlled than methods previously employed.

A further object of the invention is to provide a method whereby fluorinated telomers having a specific desired molecular weight can be obtained in good yields.

A still further object of the invention is to provide novel fluorinated telomeric products from unsaturated compounds, which novel telomeric products can be employed to prepare superior surfactants and which novel telomeric products can be employed to prepare superior oil, stain and water repellent compositions.

SUMMARY OF THE INVENTION

In accordance with the present invention, it has been found that the telomerization of various unsaturated compounds, including fluorocarbon monomers hitherto considered difficult to polymerize, may be readily effected and the degree of control that may be exercised over the molecular weight of the telomer product is substantially improved provided that certain haloisoalkoxyalkyl halides are employed as telogens in the telomerization reaction. Furthermore, the haloisoalkoxyalkyl halides employed in production of the telomers of the present invention exhibit surprisingly reactive chain transfer properties thereby making it unnecessary to use a large excess of telogen in order to avoid the production of a large amount of relatively high molecular weight products of widely varying chain lengths. Moreover, as indicated above, the telomers so produced can be converted to materials having unusually superior surfactant properties or to materials having unusually superior oil, stain and water repellent properties.

The novel compounds produced in accordance with the present invention conform to the general formula:

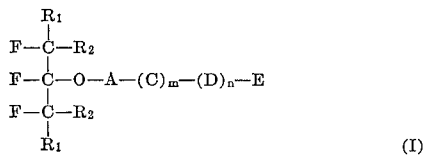

wherein:
(a) $R_1$ and $R_2$ are F, Cl or alkyl or haloalkyl groups or, when taken together, are alkylene or haloalkylene groups forming a cycloaliphatic structure, which $R_1$ $R_2$ groups may each have from 1 to 9 carbon atoms and which halogen atoms, if any, have an atomic weight not exceeding about 79.92, with the proviso that no more than two of the four $R_1$ and $R_2$ groups are alkyl groups,
(b) A is a member selected from the group consisting of radicals of the formulae:

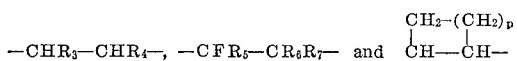

wherein $R_3$ and $R_4$ are independently selected from the group consisting of Cl, H and alkyl; $R_5$ and $R_6$ are independently selected from the group consisting of F and H; $R_7$ is selected from the group consisting of F, H, Cl, Br and perfluoroalkyl; $p$ is an integer of from 1 to 9; with the proviso that when both $R_6$ and $R_7$ are F, $R_5$ is always F,
(c) C is a bifunctional group which may be derived from a telomerizable acetylenically or ethylenically unsaturated compound,
(d) $m$ is an integer of from 1 to 75,
(e) D is a bifunctional group which may be derived from a telomerizable acetylenically or ethylenically unsaturated compound,
(f) $n$ is an integer of from 0 to 75, and
(g) E is a halogen atom or a hydrogen atom, with the proviso that if E is a bromine atom there may be no further bromine substitution in the molecule.

Those novel compounds, as above described, in which E is an iodine or bromine atom are the novel telomers of the invention. As noted heretofore, such materials may be stabilized by converting the "E" iodine or bromine atom to Cl, F or H atoms. The stabilized "telomers" are also novel compounds and come within the scope of the invention. To facilitate expression, the novel compounds of the invention, whether stabilized or unstabilized, will be referred to herein as telomers.

The criticality in the molecules of these novel and valuable telomers is in the structure of the haloisoalkoxyalkyl portion of the molecule. This portion of the molecule is critically characterized by the presence of a carbon atom linking an oxygen atom and a fluorine atom, in combination with two haloalkyl linkages satisfying the remaining valences of the carbon atom linking the oxygen and fluorine atoms. The haloalkyl linkages are characterized by the presence of at least one fluorine atom on each carbon atom which is adjacent the carbon atom which links the oxygen and fluorine atoms. The haloalkyl linkages may, when taken together, form a cycloaliphatic structure. The term polyhaloisoalkoxyalkyl herein shall be understood as including such cycloaliphatic structures.

In the above Formula I, $R_1$ and $R_2$ may be the same or different and may be F or saturated straight-chain and branched-chain alkyl, haloalkyl, alkylene or haloalkylene groups of the type indicated.

There is no absolute criticality for the length of the carbon chain when the A group contains an alkyl or perfluoroalkyl group. The only real limitation on the length of the carbon chains is solubility of the resulting products in applications for which solubility is necessary or desired.

It has been found that telomers which possess such polyhaloisoalkoxyalkyl structures, in accordance with this invention, have particularly high reactivity and that such telomers can be converted to surface active agents with unusual activity. It has further been found that those telomers additionally possessing high fluorine contents, particularly those in which $R_1$ and $R_2$ are F or perfluoroalkyl groups and in which the A moiety contains a high proportion of fluorine atoms, can be converted to polyacrylates having unusual activity as oil, stain and water repellent agents. For the purposes of this discussion, the term polyacrylate refers to methacrylate polymers as well as to acrylate polymers.

The portions of the telomer molecule defined by the bifunctional groups C and D are not critical. C and D can be derived from any telomerizable unsaturated material. The prior art discloses a vast number of such telomerizable unsaturated materials. Exemplary listings may be found in U.S. Pat. 3,083,238 and U.S. Pat. 3,145,222, the disclosures of which in this regard are hereby incorporated by reference. Such materials may be acetylenically olefinically unsaturated. When polyunsaturated materials are employed, addition or telomerization other than 1,2- is possible. For example, with butadiene, 1,4-addition or telomerization can take place.

The polyhaloisoalkoxyalkyl halide telogen employed in the preparation of the novel telomers of the present invention may be represented by the formula:

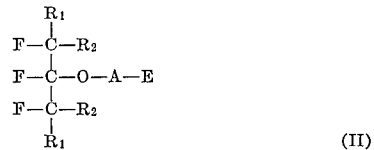

wherein $R_1$, $R_2$ and A are as previously defined and wherein E is selected from the group consisting of iodine and bromine. When E is bromine, there may not be any other bromine substitution in the molecule.

The telogen starting materials may be prepared by reaction of an appropriate halogenated ketone with an ionizable fluoride salt to form a fluorinated organic salt and then reacting the organic salt with a halogen other than fluorine (e.g. iodine, bromine) and an appropriate olefin to form the desired polyhaloisoalkoxyalkyl halide. The reactions are more fully described in copending applications of Litt et al., Ser. No. 492,276, filed Oct. 1, 1965, and Litt et al., Ser. No. 513,574, filed Dec. 13, 1965, the pertinent subject matter of which is hereby incorporated by reference. For example, as is described in Examples 1 and 3 of the former application, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula

$$(CF_3)_2CFO^-K^+$$

and thereafter reacting this addition compound with tetrafluoroethylene and iodine in the presence of an inert organic solvent to form the desired perfluoroisopropoxyethyl iodide, $(CF_3)_2CFOCF_2CF_2I$.

Telomers according to the invention wherein $n$ is 0 may be obtained by telomerizing, at reaction conditions more particularly defined hereafter, a telogen of Formula II, as above described, with a telomerizable unsaturated compound as described herein. The telomerizable unsaturated compound may be the same or different from that used as reactant with the fluorinated organic salt and halogen in preparation of the telogen starting materials. When both $m$ and $n$ are 1 or over, the products thereby defined are obtained by reacting a suitable telogen with a first telomerizable unsaturated material to form a telomer and reacting the telomer thus produced with a second telomerizable unsaturated material which may be the same or different as the first telomerizable unsaturated material. The telomerizable unsaturated compound may not contain bromine if the E atom in the telogen is bromine.

As can be seen from the above description, the telometer produced can serve as telogens for further reactions. The term telogen will be used in this sense herein. In other words, the telogen may be a telomer product produced from a telogen, which telomer produced is further telomerizable.

In general, the reaction between the telogen and the telomerizable unsaturated compound is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour, to about 48 hours.

If desired, the reaction of the present invention may be conducted by use of a catalyst or light of sufficient intensity to initiate the free radical reaction. Illustrative free radical generally catalysts include azonitriles such as alpha, alpha'-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the product telomer.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound: telogen molar ratio, the higher will be the average molecular weights of the telomer product. The ratio of telogen to unsaturated compound may vary from about 1:75 to as high as 200:1, the preferred ratio for batchwise operation being about 1:1 to 2:1 in the production of relatively low molecular weight telomers, i.e. telomers containing up to about 6 or 7 monomer units per telomer molecule. On the other hand, in a constant pressure reaction, i.e. where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties. It is intended that the appended claims cover the individual telomers as well as mixtures thereof.

The physical properties of the telomer products obtained in accordance with the present invention are dependent upon the starting reactants and the size of the telomer product and accordingly the utility of the telomer product in general varies with these properties.

The lower telomers, i.e. where the sum of $m$ and $n$ is 1 and 2, are valuable as vapor phase coolants and dielectrics for electrical equipment and as temperature differential fluids in thermometric devices. In addition, lower telomer iodides wherein the sum of $m$ and $n$ is up to about 5 are especially useful, for example, in salves and ointments, as bactericidal and bacteristatic agents since these compounds will release iodine slowly when applied to a surface.

The telomers produced in accordance with the present invention in accordance with the above described reaction in which the E atom is iodine or bromine may be converted to stabilized forms of telomers by replacing the iodine or bromine Q atom with a chlorine, fluorine or hydrogen atom. Such a replacement may be carried out by any conventional method. For example, telomer iodides or bromides as described herein, wherein $R_1$ and $R_2$ are F atoms or perfluoroalkyl groups and in which the A moiety is perfluorinated, may be reacted with elemental chlorine at a temperature from 20 to about 270° C. or reacted with a fluorinating agent such as $SbF_5$, $CoF_3$, elemental fluorine or KF in a polar solvent, at normal or elevated temperatures up to about 300° C. to form the corresponding telomer chloride or fluoride. Corresponding hydrogen replacement can be effected by reacting the telomer iodide or bromide with a mild reducing agent such as $LiAlH_4$ or with zinc and alcohol. In any event, the chlorinating, fluorinating or reducing agents and conditions chosen should be such as to enable carrying out the reaction without adverse affects on the molecule involved.

The telomers and particularly the stabilized telomers of the present invention are useful as insulators and condenser fluids. The telomer products which are oily liquids are useful as hydraulic fluids or permanent lubricants for various instruments and their chemical and thermal stability renders them excellent heat transfer media and refrigerants.

As noted above, the novel telomers prepared in accordance with this invention are also useful as intermediates in the synthesis of surface active agents possessing unusually high surface active properties. These surface active agents may be prepared by converting the telomers to acid salts having surface active properties. Telomers in which the E atom is iodine or bromine and in which the carbon atom adjacent to the E atom is perhalogenated, may be converted to the corresponding acid salts by reacting such telomers with sulfur trioxide to form intermediate acid halides and pyrosulfuryl halides.

The reaction of the telomer with sulfur trioxide should be carried out at temperatures between about 50–175° C., preferably between about 100–150° C. The molar ratio of $SO_3$ to telomer should be at least about 1:1 but preferably a molar ratio of about 2:1 to 5:1 should be employed. A sufficient pressure should be employed to maintain the reactants in the liquid phase. Depending on the volatility of the particular telomer employed and the concentration of $SO_3$, suitable pressures may range from about 25–500 p.s.i.g.

The intermediate acid halides may then be hydrolyzed to the corresponding acid salts, with an aqueous base such as potassium hydroxide, sodium hydroxide and ammonium hydroxide. The intermediate acid halides and pyrosulfuryl halides may also be hydrolyzed to the corresponding acids by refluxing with water.

Telomers in which the E atom is iodine or bromine and in which the carbon atom adjacent to the E atom contains one or more hydrogen atoms, an alkyl group, alkylene group, haloalkyl group or haloalkylene group, may be converted to the corresponding acids by converting them to Grignard reagents followed by reaction of the Grignard reagent with $CO_2$ to form the corresponding acids. The acids may then be converted to the acid salts by neutralization with an inorganic base.

Telomers in which the E atom is iodine or bromine and in which the carbon atom adjacent to the E atom contains two hydrogen atoms may be converted to the corresponding acids by reaction with $SO_3$ in a molar ratio of about 3–5 moles $SO_3$ to 1 mole of telomer, at temperatures in the range of about 30°–70° C., to form the corresponding polysulfates, hydrolyzing the polysulfates with 35–50% $H_2SO_4$ at about 100° C. to form the corresponding alcohols and oxidizing the alcohols with a permanganate or dichromate solution to the corresponding acids. The acids may then be converted to the acid salts by neutralization with an inorganic base. Other methods for preparing acid salts of the telomers of the invention may be devised by those of ordinary skill in the art.

The acid salts derived from the telomers of the invention exhibit unusually high surface active properties and may be used in the manner in which surfactants are conventionally employed, such as in the preparation of emulsions and surface coatings and to increase wettability such as in the dyeing of textile fabrics.

Acids may be generated from the salts derived from the telomers of the invention by acidification in water solution.

The acids are useful as intermediates in the preparation of oil and stain repellent agents. The acids in turn may be converted to the corresponding acid salts by neutralization with an aqueous base such as potassium hydroxide, sodium hydroxide and ammonium hydroxide, or the acids may be converted to a corresponding acid fluoride, for example, by reaction with thionyl chloride followed by reaction with an alkali metal fluoride such as KF.

Telomers conforming to general Formula I, above described, wherein $m$ is 1 or more, C is a

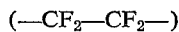

group, $n$ is 1 or more, preferably 1, D is a

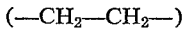

group, and wherein E is a bromine or iodine atom, are especially useful as intermediates in the synthesis of valuable polyacrylate stain repellents.

Telomers in which the carbon atom adjacent the E atom contains at least one hydrogen and wherein E is a bromine or iodine atom may be converted to the polyacrylates by contacting the telomers with sulfur trioxide to produce a polyfluoroalkylether polysulfate derivative which may then be heated with acrylic acid or methacrylic acid to produce the corresponding polyfluoroalkylether acrylate monomer. The acrylate monomer may then be subjected to emulsion polymerization in a conventional manner to produce the corresponding polyacrylate using an emulsifier, such as sodium lauryl sulfate and an initiator such as potassium persulfate. The reaction of the telomers with sulfur trioxide to produce the polyfluoroalkylether polysulfate intermediates may be carried out by reacting an appropriate telomer with at least about an equimolar amount of sulfur trioxide to obtain corresponding bis(polyhaloisoalkoxyalkyl) monosulfates or with at least about 1.5 moles of sulfur trioxide per mole of telomer reactant to obtain corresponding bis(polyhaloisoalkoxyalkyl) polysulfates. Generally it is preferred to charge between about 2–10 moles of sulfur trioxide per mole of telomer reactant to produce intermediates readily convertible to the desired acrylate monomers. Regardless of whether bis(polyhaloisoalkoxyalkyl) monosulfates or bis(polyhaloisoalkoxyalkyl) polysulfates are prepared, reaction temperatures may vary between about 0–200° C. at atmospheric pressure and preferably should be maintained between 15°–70° C. at atmospheric pressure in order to avoid undesirable side reactions. Sub- or superatmospheric pressures may also be employed. Liquid phase reaction is preferred. Preferably, temperatures and pressures should be adjusted accordingly. The time required for the reaction is dependent upon the several process variables but generally varies from about 10 minutes to 100 hours, with usual reaction times for high yields being in the order of about 30 minutes to 15 hours. If desired, the reaction may be conducted in the presence of a solvent. Suitable solvents include, for example, sulfur dioxide and halogenated hydrocarbons such as hexachloroethane and 1,1,1,3,4,4,4-heptafluoro-2,2,3-trichlorobutane. The polysulfate products may be recovered by conventional physical separatory procedures, e.g. fractional distillation or fractional crystallization. Preparation of the polysulfates is disclosed in more detail in co-pending application of Anello and Sweeney, entitled "Novel Sulfates and Methods for Their Preparation," Ser. No. 633,368, filed Apr. 25, 1967. The reaction of the polyfluoroalkylether polysulfate intermediates with the acrylic reactant is slightly exothermic but temperatures should be elevated to about 110° C. and maintained at that level for about 20 hours in order to obtain high yields of the sought-for acrylate monomers. The acrylate monomer can be purified by water washing, drying and fractional distillation. This route to acrylate monomers may be followed with any polysulfate obtained by reaction of a telomer as described herein with $SO_3$.

As indicated above, polymerization of the acrylate monomers may be accomplished by conventional methods. Temperatures for emulsion polymerization in the presence of a free radical initiator may conveniently be maintained at about 55° C. for a period from about 2–6 hours to give good yields of the corresponding polyacrylate. The acrylate monomers may be copolymerized by the same techniques for homopolymerization with a variety of comonomers such as N-methylol acrylamide and other acrylate monomers including dissimilar monomers derived from the telomers disclosed herein as well as conventional types of acrylate monomers, such as methyl methacrylate, methacrylic acid and 2-ethylhexyl acrylate. Other polymerizable vinyl compounds are suitable and will readily occur to those skilled in the art. Such copolymers as well as the homopolymers possess excellent oil and stain repellent properties, including high repellency to stain and durability to laundering, cleaning and wearing.

Polyacrylates are obtainable from the telomers described herein by another route. The telomers may be converted to polyhaloisoalkoxyfluoroalkanols of the formula:

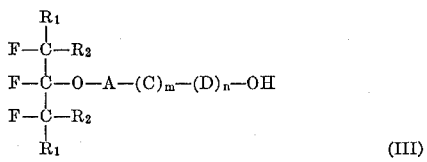

wherein $R_1$, $R_2$, A, D, C, $m$ and $n$ are as defined above, by various means.

Telomers in which the E atom is iodine or bromine and in which the carbon atom adjacent to the E atom is perhalogenated, may be converted to the corresponding 1,1-dihydromethylene alcohols by reacting such telomers with $SO_3$, as described above, to produce the corresponding acid halides, reacting the acid halides with an alkanol, at temperatures in the range of about 0–25° C. to form the corresponding ester, followed by reduction of the ester with a mild reducing agent such as $LiAlH_4$ in ether to form the 1,1-dihydro- alcohol.

Telomers in which the E atom is iodine or bromine and in which the carbon atom adjacent to the E atom contains one or more hydrogen atoms, an alkyl group, alkylene group, haloalkyl group or haloalkylene group, may be converted to the corresponding 1,1-dihydromethylene alcohols by reacting such telomers with $SO_3$, as described above, to form the corresponding polysulfates, followed by hydrolysis of the polysulfate with 35–50% $H_2SO_4$, at about 100° C. to the 1,1-dihydromethylene alcohols.

Other means for preparing 1,1-dihydromethylene alcohols from the telomers of the invention may be devised by those skilled in the art.

An additional class of 1,1-dihydromethylene alcohols may be prepared from the telomers of the invention. This class of alcohols may be represented by the formula:

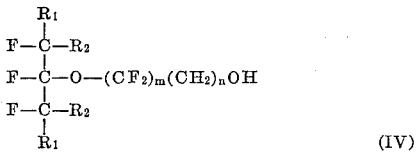

wherein $R_1$, $R_2$, $m$ and $n$ are as defined above by reacting the corresponding polyhaloisoalkoxyfluoroalkyl iodide with various reagents dependent upon the character and length of the —$CF_2$— and —$CH_2$— chains, as described below. When $m$ is an even number and $n$ is an odd or even number from 3 to 20, the alcohol may be produced by reduction of the corresponding iodo alcohol with lithium aluminum hydride or with zinc and alcohol. The production of such iodo alcohols may be effected by reacting a haloisopropoxyfluoroalkyl iodide having $m$ $CF_2$ groups in the alkyl chain with an unsaturated alcohol. Other means for preparing such iodo alcohols will readily occur to those skilled in the art.

When $m$ is an odd number from 1–19 and $n$ is an odd or even number from 4–19, the alcohols may be prepared by reacting a polyhaloisoalkoxyfluoroalkanol having an odd number of $CF_2$ groups in the fluoroalkanol chain, and any number of $CH_2$ groups from 4–19, with p-toluene sulfonyl chloride to form the tosylate, reacting the tosylate with an alkali iodide to form the polyhaloisoalkoxyfluoroalkyl iodide, then reacting the polyhaloisoalkoxyfluoroalkyl iodide with an unsaturated alcohol, such as allyl alcohol, and finally removing the iodine such as with zinc and alcohol.

When $m$ is an even number from 2–20 and $n$ is 2–3, the alcohols can be made by converting the appropriate iodide to the pyrosulfate with sulfur trioxide or to the hydrosulfate with oleum and hydrolyzing the polyfluoroisoalkoxyalkyl sulfate or hydrogen sulfate to the alcohol with aqueous acid.

The polyhaloisoalkoxyfluoroalkanols thus described may be converted directly to corresponding acrylates by reaction with the usual acrylic reactants in the same manner as described for the conversion of the bis(polyhaloisoalkoxyalkyl) monosulfates or polysulfates to the corresponding acrylates. These alkanols may also be employed to prepare fire extinguishing chemicals, paper sizes and surfactants.

DESCRIPTION OF THE PREFERRED EMBODIMENTS

With reference to Formula I for the novel telomer products of the invention, $R_1$ and $R_2$ are preferably F or perfluoroalkyl groups. If perfluoroalkyl groups, $R_1$ and $R_2$ preferably contain 1–2 carbon atoms. When the $R_1$ and $R_2$ groups contain halogen substitution, other than fluorine, or hydrogen substitution, it is preferred that enough fluorine substitution be provided so that the atomic ratio of fluorine to the other halogen atoms, to the hydrogen atoms or to the combined total of the other halogen atoms and hydrogen atoms, is at least 1:1.

The A moiety of the telomer products of Formula I is preferably perfluorinated. The preferred carbon content of the alkyl or perfluoroalkyl groups which may be contained in the A moiety is from 1–6 carbon atoms.

In the preferred embodiments E is iodine.

A preferred class of compounds within the scope of the invention is represented by the following formula:

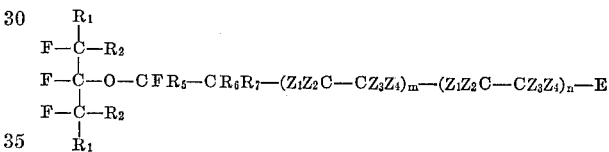

wherein:
(a) $R_1$ and $R_2$ are independently F, Cl or alkyl or haloalkyl groups, or when taken together, are haloalkylene groups forming a cycloaliphatic structure, which $R_1$ and $R_2$ groups may each have from 1 to 9 carbon atoms and which halogen atoms, if any, have an atomic weight not exceeding about 79.92, with the proviso that no more than two of the four $R_1$ and $R_2$ groups are alkyl groups,
(b) $R_5$ and $R_6$ are independently selected from the group consisting of F and H; $R_7$ is selected from the group consisting of F, H, Cl, Br and lower perfluoroalkyl; with the proviso that when both $R_6$ and $R_7$ are F, $R_5$ is always F,
(c) $Z_1$, $Z_2$, $Z_3$ and $Z_4$ are independently selected from the group consisting of H, F and Cl provided that $Z_1$–$Z_4$ do not include more than two chlorine atoms, when at least two members of the group $Z_1$, $Z_2$, $Z_3$ and $Z_4$ are H or F, the remaining two members may each be a perhalomethyl group having the formula —$C(X_a)_3$, wherein $X_a$ is a halogen atom having an atomic weight not exceeding about 79.92,
(d) $m$ is an integer of from 1 to 75,
(e) $n$ is an integer of from 0 to 75, and
(f) E is a halogen atom, with the proviso that if E is a bromine atom there may be no further bromine substitution in the molecule.

Specific examples of preferred embodiments of polyhaloisoalkoxyalkyl halide telogens or telomer intermediate "telogens" employable herein include the following:

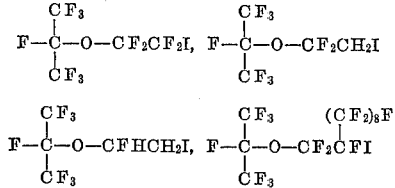

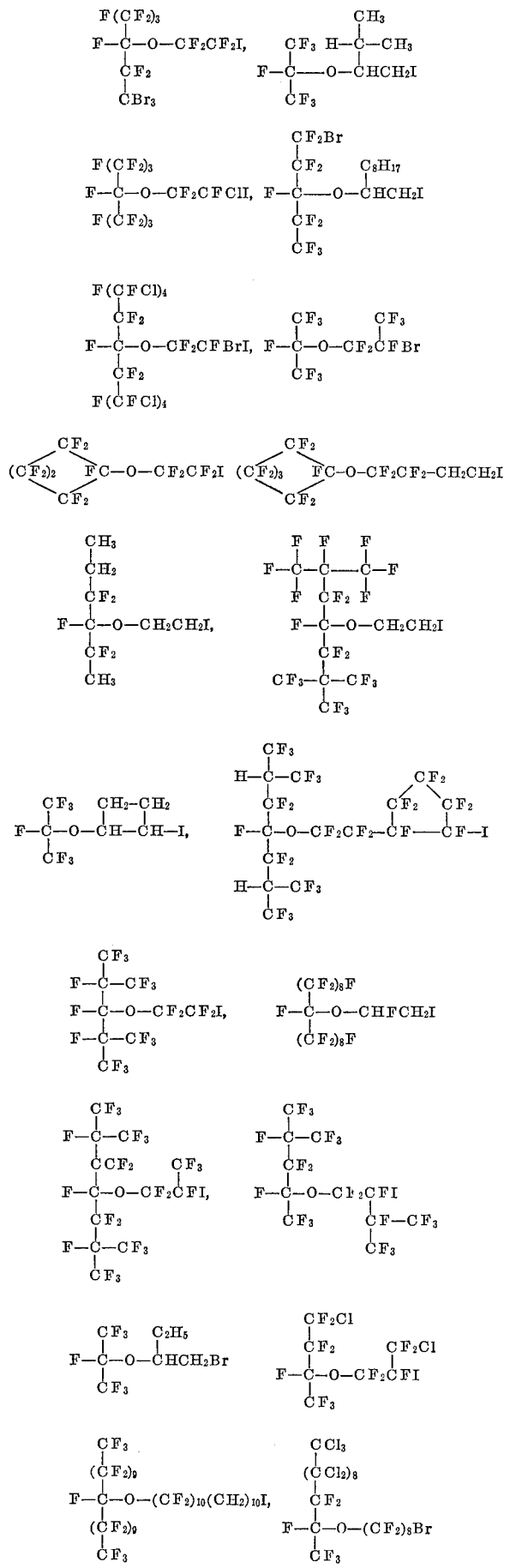
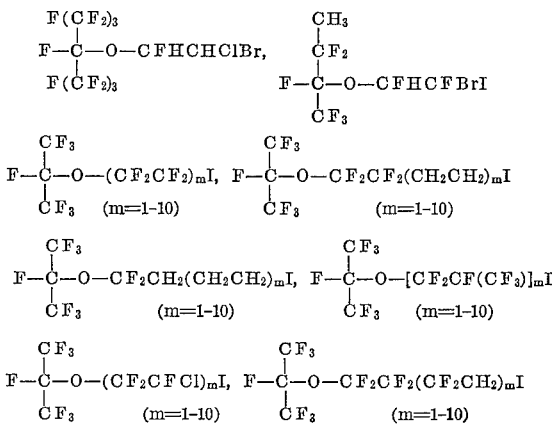

With respect to the telomerizable unsaturated material which may be employed, the ethylenically unsaturated compounds are preferred. Other preferred embodiments are delineated in U.S. Pat. 3,145,222 and U.S. Pat. 3,083,238. The following formula exemplifies more specific preferred embodiments:

$$Z_1Z_2C=CZ_3Z_4 \qquad (IV)$$

wherein:
(a) $Z_1$, $Z_2$, $Z_3$ and $Z_4$ may each be selected from the group consisting of H, F, Cl and Br provided that $Z_1$–$Z_4$ do not include more than two chlorine atoms and one bromine atom, (b) when at least two members of the group $Z_1$, $Z_2$, $Z_3$ and $Z_4$ are H or F, the remaining two members may each be a perhalomethyl group having the formula —$C(X_a)_3$, wherein $X_a$ is a halogen atom having an atomic weight not exceeding about 79.92, (c) when $Z_1$ and $Z_3$ are each H or F, each of $Z_2$ and $Z_4$ may additionally be selected from the group consisting of —$CF_2X_b$, —$Y_1$—CH=$CH_2$, —$Y_1$—$OY_2$,

—$Y_1$—$CO_2Y_2$, —$Y_1$—CON—$(Y_2)_2$,

—$Y_1$—$CONY_2$—$CH_2NY_2$—CO—$Y_2$, —$Y_1$—CN

—$Y_1$—$Y_3$, —$Y_1$—$O_2CY_2$, —$Y_1$—$OY_1$—$CO_2Y_2$ $$-Y_1-\overset{COY_2}{\underset{}{CH}}-CO_2Y_4$$

—$Y_1$—CH($CO_2Y_4)_2$, —$Y_1$—CO—$Y_1$—$CO_2Y_2$

—$OOCY_4$, —O—$Y_4$ and —O—$Y_5$, wherein $X_b$ is an alkyl radical having from 1–8 carbon atoms, or a haloalkyl radical having from 1–8 carbon atoms in which haloalkyl radical the halogen atoms have an atomic weight not exceeding about 79.92, or an alkenyl, aryl, alkyl- substituted or aryl radical, and wherein $Y_1$ is a saturated divalent alkylene bridging group or a saturated divalent halogen containing bridging group in which the halogen atoms have atomic weights not exceeding about 79.92; $Y_2$ is a member selected from the group consisting of H and alkyl; $Y_3$ is aryl, $Y_4$ is alkyl and $Y_5$ is alkenyl, perfluoroalkenyl, perfluorochloroalkenyl, perfluorobromoalkenyl or perfluorohydroalkenyl group having from 1 to 8 carbon atoms.

(d) when $Z_1$, $Z_2$ and $Z_3$ are each H or F, $X_b$ may additionally be a perfluoroalkenyl, perfluorochloroalkenyl, perfluorobromoalkenyl or perfluorohydroalkenyl group having from 1 to 8 carbon atoms, and (e) $Z_3$ and $Z_4$ or $Z_1$ and $Z_3$ may be joined together to form a cycloaliphatic ring system.

When $X_b$ in the above formula is an alkyl, haloalkyl, alkenyl or alkyl-substituted aryl radical, these may be straight-chain or branched-chain groups, preferably containing up to 12 carbon atoms. When $X_b$ is an aryl or otherwise substituted aryl radical, aryl groups such as phenyl or naphthyl and substituted derivatives thereof, including ortho-, meta- or para-substituted derivatives thereof are contemplated such as ortho-, meta- or para-tolyl; ortho-, meta- or para-chlorophenyl.

Preferred specific embodiments of the invention are telomers corresponding to the general Formula I above,

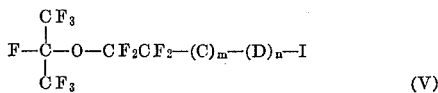
(V)

wherein C and D are derived from an ethylenically unsaturated compound selected from the group consisting of tetrafluoroethylene, ethylene, vinylidene fluoride, chlorotrifluoroethylene and perfluoropropylene; $m$ is an integer of from 1 to 75 and $n$ is an integer from 0 to 75. More preferably, $m$ and $n$ are integers of from 1–40 and still more preferably from 1–7.

More specifically preferred embodiments are those in which in above Formula V, C is derived from tetrafluoroethylene and D is derived from ethylene. When D is derived from ethylene, the preferred value for $n$ is 1. Another preferred class of compounds are those of Formula V wherein C is derived from tetrafluoroethylene and $n$ is 0.

A preferred specific embodiment of the invention are telomers of the formula:

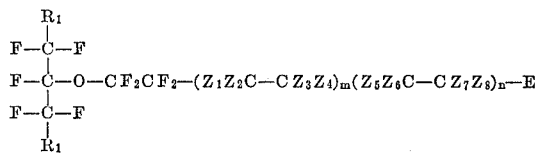

wherein:
(a) $R_1$ are independently F or haloalkyl groups, or when taken together, are haloalkylene groups forming a cycloaliphatic structure, which $R_1$ groups may each have from 1 to 9 carbon atoms and which halogen atoms, if any, have an atomic weight not exceeding about 79.92,
(b) $Z_1$, $Z_2$, $Z_3$, $Z_4$, $Z_5$, $Z_6$, $Z_7$ and $Z_8$ are independently selected from the group consisting of H and F,
(c) $m$ is an integer of from 1–75,
(d) $n$ is an integer of from 0–75, and
(e) E is a halogen atom selected from the group consisting of I and Br.

Unsaturated compounds suitable for reaction with the polyhaloisoalkoxyalkyl halide telogen of Formula II above, include the following: $CF_2=CF_2$, $CF_2=CH_2$, $CCl_2=CH_2$, $CFH=CH_2$, $CClH=CH_2$, $CH_2=CH_2$, $CFH=CF_2$, $CFH=CFH$, $CClH=CClH$, $CF_2=CFCl$,
$CF_2=CFBr$, $CF_3CF=CF_2$, $CF_2ClCF=CF_2$
$CF_3CH=CF_2$, $CF_3CCl=CF_2$, $(CF_3)_2C=CF_2$
$CF_3CF=CFCl$, $CF_3CH=CFCl$, $CFCl=CFCl$
$CF_3CF=CH_2$, $CF_2ClCF=CF_2$, $CF_2BrCF=CF_2$
$CF_3CF=CFCF_3$, $CF_2=CFCF=CF_2$
$CFCl=CFCF=CF_2$, $CF_2=CClCF=CF_2$
$CFCl=CFCF=CFCl$, $CF_2=CClCCl=CF_2$
$CF_2=CFCH=CF_2$, $CHF=CFCF=CF_2$
$CF_2=CHCH=CF_2$, $CHF=CFCFCl_2$, $CHF=CFCF_3$
$CF_2=CF(CH_2)_6CH_3$, $CF_2=CFCHClCH_3$
$CF_2=CF(C_6H_4Cl)$, $CF_2=CF(C_6H_4(CH_3))$
$CF_2=CF(C_6H_4(CH_2Cl))$, $CF_2=CHCF_2CH_3$
$CF_2=CHCF_2CH_2Cl$, $CF_2=CHCF_2(C_6H_5)$
$CF_2=CHCF_2(C_6H_4Cl)$, $CF_2=CHCF_2(C_6H_4(CH_3))$
$CF_2=CHCF_2(C_6H_4(CH_2Cl))$, $CH_2=CCF_3CF_2Br$
$CF_2=C(CF_3)CF_2(C_3H_7)$, $CHCl=CFCF_3$
$CH_2=CClCF_2CH_3$, $CF_2=C=CF_2$,

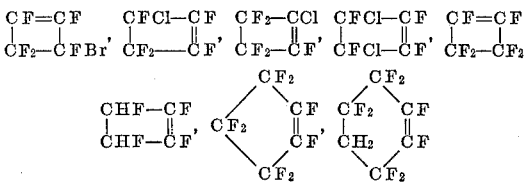

$CH_2=CHO_2CCH_3$, $CH_2=CHCH_2O_2CCH_3$
$CH_2=CH(CH_2)_9O_2CC_2H_5$
$CH_2=CH(CH_2)_2O(CH_2)_2CO_2H$
$CH_2=CH(CH_2)_3CO_2H$, $CH_2=CH(CH_2)_3CO_2C_2H_5$
$CH_2=CHCH_2CH(CO_2CH_3)_2$, $CH_2=C(C_2H_5)_2$
$CH_2=CH(CH_2)_8CO(CH_2)_5CO_2H$
$(CH_2=CH(CH_2)_8CONH)_2CH_2$, $CH_2=CHCO_2C_2H_5$
$CH_2=CH-C_6H_5$, $CH_2=CHCH_2CH(OC_2H_5)_2$
$(CH_2=CHCH_2)_2O$, $CH_2=CHCH_2O(CH_2)_2OH$,

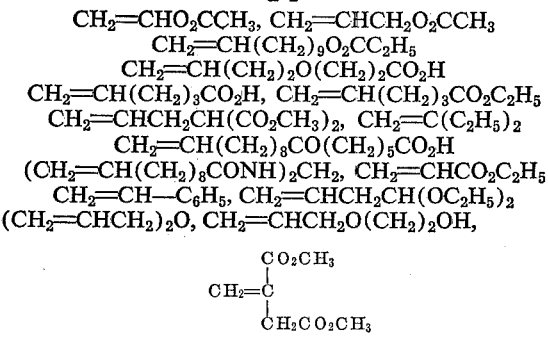

$C_2H_2$, $C_4H_9C\equiv CH$ and $HC\equiv CC_6H_5$. A portion of this listing has been taken from the exemplary telomerizable unsaturated compounds listed in U.S. Pat. 3,145,222. Many more suitable telomerizable unsaturated compounds will readily occur to one of ordinary skill in the art. As noted hereinabove the moiety in the telomer iodide denoted by the telomerizable unsaturated compound is not a critical portion of the molecule.

The following examples provide a further description of the invention, it being understood that these examples are given for purposes of illustration only and are not to be regarded as restricting the invention beyond the scope of the appended claims.

EXAMPLE 1

Thermal reaction of heptafluoroisopropyl - 2 - iodotetrafluoroethyl ether with tetrafluoroethylene A 300 ml. stainless steel autoclave was charged under a dry nitrogen atmosphere with 96 grams (0.23 mole) of heptafluoroisopropyl-2-iodotetrafluoroethyl ether. The reactor was cooled first in Dry Ice and then in liquid nitrogen, evacuated and then 23 grams (0.23 mole) of tetrafluoroethylene were admitted into the autoclave by gaseous transfer in vacuo. The autoclave was sealed, heated with shaking for 24 hours at 175° C. and then allowed to cool to room temperature. The gaseous content of the autoclave was then vented and the remaining liquid was recovered. Chromatographic analysis of this material showed it to be a mixture composed of the starting telogen and telomer iodides of the formula $(CF_3)_2CFOCF_2CF_2(CF_2CF_2)_nI$ in which the value of $n$ ranged from 1 to 5; in 90% of the telomers produced the value of $n$ ranged from 1 to 3.

The mixture was separated by fractional distillation into the following fractions:

(a) 58 g. (0.14 mole) of starting material,

B.P. 86–87° C./760 mm.

*Analysis.*—Calculated for $C_5F_{11}OI$ (percent): C, 14.56; F, 50.73; I, 30.82. Found (percent): C, 14.6; F, 51.3; I, 29.8.

(b) 19 g. (0.038 mole) of

B.P. 38–41° C./25 mm.

*Analysis.*—Calculated for $C_7F_{15}OI$ (percent): C, 16.41; F, 55.66; I, 24.80. Found (percent): C, 16.8; F, 56.7; I, 23.3.

(c) 14 g. (0.024 mole) of

B.P. 72–75° C./25 mm.

*Analysis.*—Calculated for $C_7F_{19}OI$ (percent): C, 17.65; F, 58.99; I, 20.75. Found (percent): C, 17.7; F, 59.5; I, 20.0.

(d) 14 g. (0.020 mole) of

B.P. 66–67° C./2 mm.

*Analysis.*—Calculated for $C_{11}F_{15}OI$ (percent): C, 18.54; F, 61.8; I, 17.84. Found (percent): C, 18.2; F, 62.0; I, 16.9.

(e) 5 g. (0.006 mole) of $$(CF_3)_2CFOCF_2CF_2(CF_2CF_2)_4I$$

B.P. 116° C./4 mm.

*Analysis.*—Calculated for $C_{13}F_{27}OI$ (percent): C, 19.21 F, 63.18; I, 15.64. Found (percent): C, 18.5; F, 64.0; I, 16.3.

(f) 2 g. (0.002 mole) of $$(CF_3)_2CFOCF_2CF_2(CF_2CF_2)_nI$$

where the value of $n$ was greater than 4 and mostly in the range of about 5.

EXAMPLE 2

Using the procedure of Example 1, a 300 ml. stainless steel autoclave was charged with 201 grams (0.488 mole) of heptafluoroisopropyl-2-iodotetrafluoroethyl ether and 51 grams (0.51 mole) of tetrafluoroethylene. The autoclave was sealed, heated with shaking for 18 hours at 200° C., cooled to room temperature and the gaseous constituents vented therefrom. A liquid product comprised of a mixture of telomers was recovered. The mixture was separated by fractional distillation into the following fractions:

(a) 115 g. (0.280 mole) of starting material, $$(CF_3)_2CFOCF_2CF_2I$$

B.P. 86–87° C./760 mm.

(b) 34 g. (0.067 mole) of $$(CF_3)_2CFOCF_2CF_2CF_2CF_2I$$

B.P. 40–43° C./25 mm.

(c) 19 g. (0.031 mole) of $$(CF_3)_2CFOCF_2CF_2(CF_2CF_2)_2I$$

B.P. 70–73° C./25 mm.

(d) 18 g. (0.025 mole) of $$(CF_3)_2CFOCF_2CF_2(CF_2CF_2)_3I$$

B.P. 79–82° C./10 mm.

(e) 14 g. (0.017 mole) of $$(CF_3)_2CFOCF_2CF_2(CF_2CF_2)_4I$$

B.P. 107–110° C./5 mm.

(f) 4.2 g. (0.005 mole) of $$(CF_3)_2CFOCF_2CF_2(CF_2CF_2)_5I$$

B.P. 128–130° C./5 mm.

(g) 5.9 g. (0.006 mole) of $$(CF_3)_2CFOCF_2CF_2(CF_2CF_2)_6I$$

B.P. 151–156° C./5 mm.

(h) 11.1 g. (0.0091 mole) of $$(CF_3)_2CFOCF_2CF_2(CF_2CF_2)_nI$$

where the value of $n$ was greater than 6 and mostly in the range of about 7.

EXAMPLE 3

Using the procedure of Example 1, a 300 ml. stainless steel autoclave was charged with 200 grams (0.486 mole) of heptafluoroisopropyl-2-iodotetrafluoroethyl ether and 46 grams (0.46 mole) of tetrafluoroethylene. The autoclave was sealed, heated with shaking for 18 hours at 250° C., cooled to room temperature and the gaseous constituents vented therefrom. A liquid product comprised of a mixture of telomers was obtained and then separated by fractional distillation into the following fractions:

(a) 111 g. (0.270 mole) of $$(CF_3)_2CFOCF_2CF_2I$$

(b) 30 g. (0.059 mole) of $$(CF_3)_2CFOCF_2CF_2CF_2CF_2I$$

(c) 22 g. (0.036 mole) of $$(CF_3)_2CFOOF_2CF_2(CF_2CF_2)_2I$$

(d) 11 g. (0.015 mole) of $$(CF_3)_2CFOCF_2CF_2(CF_2CF_2)_3I$$

(e) 10 g. (0.013 mole) of $$(CF_3)_2CFOCF_2CF_2(CF_2CF_2)_4I$$

(f) 3.2 g. (0.035 mole) of $$(CF_3)_2CFOCF_2CF_2(CF_2CF_2)_5I$$

(g) 7.3 g. (0.0072 mole) of $$(CF_3)_2CFOCF_2CF_2(CF_2CF_2)_nI$$

where the value of $n$ is greater than 5 and mostly in the range of about 6.

EXAMPLE 4

Catalytic reaction of heptafluoroisopropyl-2-iodotetrafluoroethyl ether with tetrafluoroethylene Using the procedure of Example 1, a 300 ml. stainless steel autoclave was charged with 200 grams (0.486 mole) of the heptafluoroisopropyl-2-iodotetrafluoroethyl ether, 45 grams (0.45 mole) of tetrafluoroethylene and 2 grams of di-t-butylperoxide as catalyst. The autoclave was sealed, heated with shaking for 18 hours at 125° C., cooled to room temperature and the gaseous constituents vented therefrom. A liquid product comprised of a mixture of telomers was recovered and then separated by fractional distillation into the following fractions:

(a) 115 g. (0.279 mole) of $$(CF_3)_2CFOCF_2CF_2I$$

(b) 22.4 g. (0.044 mole) of $$(CF_3)_2CFOCF_2CF_2CF_2CF_2I$$

(c) 15.6 g. (0.025 mole) of $$(CF_3)_2CFOCF_2CF_2(CF_2CF_2)_2I$$

(d) 17 g. (0.024 mole) of $$(CF_3)_2CFOCF_2CF_2(CF_2CF_2)_3I$$

(e) 10 g. (0.012 mole) of $$(CF_3)_2CFOCF_2CF_2(CF_2CF_2)_nI$$

where the value of $n$ was greater than 3 and mostly in the range of about 4.

EXAMPLE 5

Thermal reaction of heptafluoroisopropyl-2-iodotetrafluoroethyl ether with ethylene Using the procedure of Example 1, a 300 ml. stainless steel autoclave was charged with 90 grams (0.22 mole) of heptafluoroisopropyl-2-iodotetrafluoroethyl ether and 6 grams (0.21 mole) of ethylene. The autoclave was sealed, heated with shaking for 18 hours at 200° C., cooled to room temperature and the gaseous constituents vented therefrom. A liquid product comprised of a mixture of telomers was recovered and then separated by fractional distillation into the following fractions:

(a) 7 g. (0.017 mole) of starting material $$(CF_3)_2CFOCF_2CF_2I$$

B.P. 86–87° C./760 mm.

17

(b) 77 g. (0.18 mole) of $(CF_3)_2CFOCF_2CF_2CH_2CH_2I$, B.P. 85–86° C./100 mm.

(c) 4 g. (0.008 mole) of $$(CF_3)_2CFOCF_2CF_2(CH_2CH_2)_2I$$

B.P. 112–114° C./50 mm.

EXAMPLE 6

Catalytic reaction of heptafluoroisopropyl-2-iodotetrafluoroethyl ether with ethylene Using the procedure of Example 1, a 300 ml. stainless steel autoclave was charged with 150 grams (0.364 mole) of heptafluoroisopropyl-2-iodotetrafluoroethyl ether, 15 grams (0.54 mole) of ethylene and 1.9 grams of $\alpha,\alpha'$-azobisisobutyronitrile as catalyst. The autoclave was sealed, heated with shaking for 18 hours at 80° C., cooled to room temperature and the gaseous constituents vented therefrom. Chromatographic analysis of this material showed it to be a mixture composed of 13% starting material and 87% telomer iodides of the formula $$(CF_3)_2CFOCF_2CF_2(CH_2CH_2)_nI$$

These telomer iodides consisted essentially of telomers in which the value of $n$ ranged from 1 to 2. The mixture was separated by fractional distillation into the following fractions:

(a) 24 g. (0.058 mole) of starting material, $$(CF_3)_2CFOCF_2CF_2I$$

B.P. 86–87° C./760 mm.

(b) 93 g. (0.21 mole) of $$(CF_3)_2CFOCF_2CF_2(CH_2CH_2)_1I$$

B.P. 86₄88° C./100 mm.

*Analysis.*—Calculated for $C_7H_{11}IO$ (percent): C, 19.11; H, 0.92; F, 47.49; I, 28.84. Found (percent): C, 19.18; H, 1.06; F, 47.22; I, 29.07.

(c) 34 g. (0.073 mole) of $$(CF_3)_2CFOCF_2CF_2(CH_2CH_2)_2I$$

B.P. 112–114° C./50 mm.

*Analysis.*—Calculated for $C_9H_8F_{11}IO$ (percent): C, 23.09; H, 1.73; F, 44.65; I, 27.11. Found (percent): C, 23.34; H, 1.88; F, 44.25; I, 27.45.

EXAMPLE 7

Catalytic reaction of heptafluoroisopropyl-2-iodotetrafluoroethyl ether with ethylene Using the procedure of Example 1, a 300 ml. stainless steel autoclave was charged with 150 grams (0.364 mole) of heptafluoroisopropyl-2-iodotetrafluoroethyl ether, 10 grams (0.365 mole) of ethylene and 1.5 grams of di-t-butyl peroxide as catalyst. The autoclave was sealed, heated with shaking for 18 hours at 130° C., cooled to room temperature and the gaseous constituents vented therefrom. Chromatographic analysis of this mixture showed it to be essentially telomer iodides of the formula $(CF_3)_2CFOCF_2CF_2(CH_2CH_2)_nI$. These telomer iodides consisted essentially of telomers in which the value of $n$ ranged from 1 to 3. The mixture was separated by fractional distillation into the following fractions:

(a) 6 g. (0.014 mole) of starting material $$(CF_3)_2CFOCF_2CF_2I$$

B.P. 86–87° C./760 mm.

(b) 100 g. (0.228 mole) of $$(CF_3)_2CFOCF_2CF_2(CH_2CH_2)_1I$$

B.P. 86–88° C./100 mm.

(c) 33 g. (0.071 mole) of $$(CF_3)_2CFOCF_2CF_2(CH_2CH_2)_2I$$

B.P. 112–114° C./50 mm.

18

(d) 6 g. (0.013 mole) of $$(CF_3)_2CFOCF_2CF_2(CH_2CH_2)_3I$$

B.P. 143° C./50 mm.

EXAMPLE 8

Thermal reaction of heptafluoroisopropyl-2-iodotetrafluoroethyl ether with vinylidene fluoride Using the procedure of Example 1, a 300 ml. stainless steel autoclave was charged with 150 grams (0.364 mole) of heptafluoroisopropyl-2-iodotetrafluoroethyl ether and 23 grams (0.36 mole) of vinylidene fluoride. The autoclave was sealed, heated with shaking for 18 hours at 200° C., cooled to room temperature and the gaseous constituents vented therefrom. A liquid product comprised of a mixture of telomers was recovered and then separated by fractional distillation into the following fractions:

(a) 114 g. (0.270 mole) of starting material $$(CF_3)_2CFOCF_2CF_2I$$

B.P. 86–87° C./760 mm.

(b) 12 g. (0.025 mole) of $$(CF_3)_2CFOCF_2CF_2CH_2I$$

B.P. 72–74° C./75 mm.

*Analysis.*—Calculated for $C_7H_2F_{13}IO$ (percent): C, 17.66 H, 0.40; F, 51.89; I, 26.66. Found (percent): C, 17.45; H, 0.44; F, 52.16; I, 26.94.

EXAMPLE 9

Catalytic reaction of heptafluoroisopropyl-4-iodooctafluorobutyl ether with ethylene Using the procedure of Example 1, a 300 ml. stainless steel autoclave was charged with 100 grams (0.196 mole) of heptafluoroisopropyl-4-iodooctafluorobutyl ether having the formula $(CF_3)_2CFOCF_2CF_2CF_2CF_2I$, 6.0 grams (0.21 mole) of ethylene and 1.5 grams of $\alpha,\alpha'$-azobisisobutyronitrile as catalyst. The autoclave was sealed, heated with shaking for 10 hours at 80° C., cooled to room temperature and the gaseous constituents vented therefrom. The remaining liquid product was recovered. Chromatographic analysis of this mixture showed it to be a mixture of 34% starting material and 66% telomer iodide of the formula $(CF_3)_2CFOCF_2CF_2CF_2CF_2CH_2CH_2I$. This mixture was separated by fractional distillation into the following fractions:

(a) 25 g. (0.050 mole) of starting material $$(CF_3)_2CFOCF_2CF_2CF_2CF_2I$$

B.P. 39–44° C./35 mm.

(b) 69 g. (0.13 mole) of $$(CF_3)_2CFOCF_2CF_2CF_2CF_2CH_2CH_2I$$

B.P. 75–76° C./15 mm.

*Analysis.*—Calculated for $C_9H_4F_{15}IO$ (percent): C, 20.00; H, 0.75; F, 52.78; I, 23.50. Found (percent): C, 20.23; H, 0.87; F, 51.91; I, 23.63.

EXAMPLE 10

Catalytic reaction of heptafluoroisopropyl-6-iodododecafluorohexyl ether with ethylene Using the procedure of Example 1, a 300 ml. stainless steel autoclave was charged with 137 grams (0.224 mole) of heptafluoroisopropyl - 6 - iodododecafluorohexyl ether having the formula $(CF_3)_2CFOCF_2CF_2(CF_2CF_2)_2I$, 6.2 grams (0.224 mole) of ethylene and 1.5 g. of di-t-butyl peroxide as catalyst. The autoclave was sealed, heated with shaking for 18 hours at 135° C., cooled to room temperature and the gaseous constituents vented therefrom. The remaining liquid product was recovered. This mixture was separated by fractional distillation into the following fractions:

(a) 11.3 g. (0.018 mole) of starting material $$(CF_3)_2CFOCF_2CF_2(CF_2CF_2)_2I$$

B.P. 70–73° C./25 mm.

(b) 120 g. (0.188 mole) of $$(CF_3)_2CFOCF_2CF_2(CF_2CF_2)_2CH_2CH_2I$$

B.P. 100–104° C./15 mm.

EXAMPLE 11

Catalytic reaction of heptafluoroisopropyl-8-iodohexadecafluorooctyl ether with ethylene Using the procedure of Example 1, a 300 ml. stainless steel autoclave was charged with 176 g. (0.247 mole) of heptafluoroisopropyl - 8 - iodohexadecafluorooctyl ether, 7.0 grams (0.247 mole) of ethylene and 1.5 grams of di-t-butyl peroxide as catalyst. The autoclave was sealed, heated with shaking for 18 hours at 135° C., cooled to room temperature and the gaseous constituents vented therefrom. The remaining liquid product was recovered. This mixture was separated by fractional distillation into the following fractions:

(a) 13 g. (0.018 mole) of starting material $$(CF_3)_2CFOCF_2CF_2(CF_2CF_2)_3I$$

B.P. 79–82° C./10 mm.

(b) 161 g. (0.217 mole) of $$(CF_3)_2CFOCF_2CF_2(CF_2CF_2)_3CH_2CH_2I$$

B.P. 107–110° C./5 mm., M.P. 44–45° C.

EXAMPLE 12

Catalytic reaction of heptafluoroisopropyl-2-iodotetrafluoroethyl ether with ethyl 3-butenoate A mixture of 33 grams (0.29 mole) of ethyl 3-butenoate (B.P. 124° C.), 93 grams (0.23 mole) of heptafluoroisopropyl - 2 - iodotetrafluoroethyl ether and 0.82 gram (0.005 mole) of benzoyl peroxide was stirred and heated at 90° C. for a period of 3 hours. At the end of this period an additional 0.49 gram (0.003 mole) of benzoyl peroxide was added to the reaction mixture and heating was continued for another 4 hours. At the end of this period, the reaction mixture was fractionally distilled at reduced pressure. The following fractions were obtained:

(a) 20 g. (0.05 mole) of starting material $$(CF_3)_2CFOCF_2CF_2I$$

B.P. 48–49° C./180 mm.

(b) 14 g. of $CH_2=CHCH_2COOC_2H_5$, B. P. 55–60° C./65 mm.

(c) 55 g. (62% yield based on 79% conversion) of $$(CF_3)_2CFOCF_2CF_2CH_2CH(CH_2COOC_2H_5)I,$$

B.P. 67–68° C./0.2 mm., $n_D^{24}=1.3813$.

*Analysis.*—Calculated for $C_{11}H_{10}F_{11}IO_3$ (percent): C, 25.1; H, 1.9; I, 24.1. Found (percent): C, 24.9; H, 1.9; I, 24.7.

EXAMPLE 13

Catalytic reaction of heptafluoroisopropyl-2-iodotetrafluoroethyl ether with methyl 10-undecenoate A mixture of 130 grams (0.67 mole) of methyl 10-undecenoate, 305 grams (0.76 mole) of heptafluoroisopropyl-2-iodotetrafluoroethyl ether and 8.0 grams (0.04 mole) of benzoyl peroxide was stirred and heated at 99–100° C. for a period of 5 hours. At the end of this period, the reaction mixture was fractionally distilled at reduced pressure. 342 grams (85% yield) of a product boiling at 124–126° C./0.3 mm., $n_D^{23}=1.4044$ were recovered. The product was identified as $$(CF_3)_2CFOCF_2CF_2CH_2CH((CH_2)_8COOCH_3)I$$

EXAMPLE 14

Preparation of bis(3,3,4,4-tetrafluoro-4-heptafluoroisopropoxybutyl) pyrosulfate Into a glass lined pressure reaction vessel equipped with a pressure gauge and magnetic stirrer, connected to a Dry Ice-acetone cooled trap there were charged 70 grams of 1 - iodo - 3,3,4,4 - tetrafluoro-4-heptafluoroisopropoxybutane, $(CF_3)_2CFOCF_2CF_2CH_2CH_2I$. 50 grams of sulfur trioxide were slowly added to the reaction vessel with ice-cooling. The reaction vessel was then sealed and heated to 95° to 100° C. for 16 hours during which period the pressure increased to 70 p.s.i.g. and two liquid phases were formed. The two liquid phases were then separated following which the separated upper layer of the two-phase system was heated to 90° C./2 mm. for a period of 3 hours to remove volatiles which were subsequently identified as sulfur trioxide and iodine. There were recovered 67 grams of an amber colored viscous oil (boiling point 120° C./1 mm.), identified as bis(3,3,4,4-tetrafluoro-4-heptafluoroisopropoxybutyl)pyrosulfate, $$(CF_3)_2CFOCF_2CF_2CH_2CH_2O(SO_3)_2$$
$$CH_2CH_2CF_2CF_2OCF(CF_3)_2$$

*Analysis.*—Calculated for $C_{14}F_{22}H_8S_2O_9$ (percent): C, 20.95; F, 52.12; H, 0.997; S, 7.91. Found (percent): C, 21.5; F, 51.8; H, 1.05; S, 8.25.

EXAMPLE 15

Preparation of 3,3,4,4-tetrafluoro-4-heptafluoroisopropoxybutyl acrylate

Into a reaction vessel equipped with a stirrer, reflux condenser and thermometer, there were placed 25 grams of bis(3,3,4,4 - tetrafluoro-4-heptafluoroisopropoxybutyl) pyrosulfate and 14 grams of acrylic acid. The mixture was then heated to 105° C. for 24 hours during which period two liquid phases formed in the reaction vessel. The liquid contents of the reaction vessel were cooled to room temperature and the two liquid phases were separated. The lower water insoluble phase (25 grams) was distilled to yield 10 grams (95% yield) of 3,3,4,4-tetrafluoro-4-heptafluoroisopropoxybutyl acrylate having the structural formula $$(CF_3)_2CFOCF_2CF_2CH_2CH_2OCOCH=CH_2$$

having a boiling point of 56° C./4 mm.

EXAMPLE 16

Preparation of bis(1,1,2,2-tetrahydrooctafluoro-6-heptafluoroisopropoxyhexyl) pyrosulfate A 250 ml. three-neck flask, connected to a Dry Ice-acetone cooled trap was charged with 61 grams (0.113 mole) of 1 - iodo - 1,1,2,2-tetrahydrooctafluoro-6-heptafluoroisopropoxyhexane, $(CF_3)_2CFOCF_2CF_2CF_2CF_2CH_2CH_2I$, (boiling point 75–76° C./15 mm.). To the reaction vessel there were then slowly added 35 grams (0.44 mole) of stabilized sulfur trioxide. The resulting mixture was heated to 60° C. for a period of about three hours during which period two liquid phases formed. The liquid reaction mixture was cooled to room temperature and the gaseous constituents present in the flask were then vented to a Dry Ice-acetone trap. The trapped material (about 5 grams) was identified as sulfur dioxide. The two phases of the liquid reaction mixture were separated following which the separated upper phase (68 grams) was heated to 65° C./2 mm. for two hours to remove volatiles such as sulfur trioxide and iodine. There were recovered 57 grams (0.057 mole, 100% yield) of a solid having the formula $[(CF_3)_2CFOCF_2CF_2CF_2CF_2CH_2CH_2OSO_2]_2O$ melting point 29–31° C.).

*Analysis.*—Calculated for $C_{18}F_{30}H_8S_2O_9$ (percent): C, 21.54; F, 56.89; H, 0.80; S, 6.39. Found (percent) C, 21.70; F, 56.2; H, 0.75; S, 6.75.

EXAMPLE 17

Preparation of 1,1,2,2-tetrahydrooctafluoro-6-heptafluoroisopropoxyhexyl acrylate Into a reaction vessel equipped with a stirrer, reflux condenser and thermometer, there were placed 51 grams of bis(1,1,2,2 - tetrahydrooctafluoro-6-heptafluoroisopropoxyhexyl) pyrosulfate and 15 grams of acrylic acid. The mixture was then heated to 105° C. for a period of 24 hours during which period two liquid phases formed in the reaction vessel. The liquid contents of the reaction vessel were cooled to room temperature and the two liquid phases were separated. The lower water-insoluble phase (45 grams) was distilled to yield 38 grams (70%) of 1,1,2,2-tetrahydrooctafluoro - 6 - heptafluoroisopropoxyhexyl acrylate having the structural formula

boiling point 48–51° C./1.5 mm.

EXAMPLE 18

Preparation of 3,3,4-4-tetrafluoro-4-heptafluoroisopropoxy-1-butanol

A flask was charged with 880 grams of 20% oleum. Then 440 grams (1.0 mole) of 3,3,4,4-tetrafluoro-4-heptafluoroisopropoxybutyl iodide were added at 25° C. over a one hour period. The mixture was then further heated to 50° C. for ½ hour to complete formation of the hydrosulfate. The mixture was then added to 2,331 grams of water and the resulting mixture was heated at 82° C. for 16.5 hours to hydrolyze the hydrosulfate to the alcohol. The solution was filtered and 61 grams (0.23 mole) of iodine were recovered. The filtrate was decolorized with 45 grams of $Na_2S_2O_5$ and the water-insoluble oil was separated, combined with methylene chloride extracts of the aqueous phase, dried and distilled. From the distillation products there were recovered 9.6 grams (0.022 mole) of the starting iodide, and 281 grams (0.85 mole) of 3,3,4,4 - tetrafluoro-4-heptafluoroisopropoxy-1-butanol corresponding to a conversion of 85%, a yield of 87%.

EXAMPLE 19

Preparation and polymerization of 3,3,4,4-tetrafluoro-4-heptafluoroisopropoxybutyl acrylate (a) Preparation.—Into a 1 neck 50 ml. flask equipped with a stirrer, reflux condenser and thermometer, were placed 17 grams (0.052 mole) of 3,3,4,4-tetrafluoro-4-(heptafluoroisopropoxy)-1-butanol, $(CF_3)_2CFO-CF_2CF_2CH_2CH_2OH$, 0.09 gram hydroquinone and 12 grams (0.13 mole) of acrylyl chloride, $CH_2=CHCOCl$. About 0.1 gram of $CuCl_2$ was added as catalyst. The mixture was slowly heated at 30° C. HCl was evolved and heating was stopped. Over a period of 1 hour the temperature of the mixture was raised to 40° C. and then to 75° C. over a period of 3 hours. The reaction mixture was then cooled and the product distilled on a spinning band column. The excess acrylyl chloride was flashed off and the remainder was distilled, yielding 13 grams of 3,3,4,4-tetrafluoro-4-(heptafluoroisopropoxy)butyl acrylate corresponding to a yield of 65.3%.

(b) Polymerization.—Into a 100 ml., 3 neck flask were placed 2.5 grams of 3,3,4,4-tetrafluoro-4-(heptafluoroisopropoxy)-butyl acrylate with 20 grams deionized water, 0.17 gram of 30% $H_2O_2$ solution and 0.9 gram of emulsifier (prepared by mixing 6 parts of cetyl dimethyl amine, 2 parts of glacial acetic acid and 24 parts of water). The reaction flask was flushed with nitrogen. The temperature of the reaction mixture was raised to 55° C. and within 4 hours polymerization took place yielding a stable emulsion of polymer.

EXAMPLE 20

Preparation of 3,3,4,4-tetrafluoro-4-heptafluoroisopropoxybutyl methacrylate

Into a 100 ml., 3 neck flask equipped with a stirrer, reflux condenser and thermometer there were placed 25 grams (0.057 mole) of 3,3,4,4-tetrafluoro-4-heptafluoroisopropoxybutyl iodide, $(CF_3)_2CFOCF_2CF_2CH_2CH_2I$ and 20 grams (0.10 mole) of $AgOCOC(CH_3)=CH_2$. About 1.0 gram of hydroquinone was added to the reaction mixture. The reaction mixture was then heated to 110–115° C. and maintained at that temperature for a period of about 16 hours. At the end of this period the reaction product mixture was washed with water, dried and distilled. There were recovered 19 grams (0.048 mole, 84% yield) of 1,1,2,2-tetrahydrotetrafluoro-4-heptafluoroisopropoxybutyl methacrylate, $(CF_3)_2CFOCF_2CF_2CH_2CH_2OCOC(CH_3)=CH_2$, B.P. 61° C./4 mm. Calculated for $C_{11}F_{11}H_9O_3$ (percent): C, 33.16; F, 52.51; H, 2.26. Found (percent). C, 34.25; F, 52.98; H, 2.15.

EXAMPLE 21

Preparation and polymerization of 3,3,4,4-tetrafluoro-4-heptafluoroisopropoxybutyl methacrylate (a) Preparation.—Into a 250 ml., 3-neck flask equipped with stirrer, thermometer, reflux condenser and Dean-Stark tube were placed 68 grams (0.207 mole) of 3,3,4,4 - tetrafluoro-4-(heptafluoroisopropoxy)-1-butanol, $(CF_3)_2CFO-CF_2CF_2CH_2CH_2OH$, together with 18 grams (0.210 mole) of methacrylic acid, 0.7 gram of concentrated (96%) $H_2SO_4$, 2 grams of hydroquinone and 150 ml. of benzene. This mixture was heated with stirring to reflux. After about 6 hours, 2.9 grams (0.16 mole) of water had collected in the Dean-Stark tube and the remaining material was transferred to a distillation flask. The benzene was flashed off and there were recovered 4 grams (0.012 mole) of the starting alcohol and 67 grams (0.17 mole, 82% conversion, 88% yield) of the methacrylate ester $(CF_3)_2CFO-CF_2CF_2CH_2CH_2OCOC(CH_3)=CH_2$ B.P. 61–63° C./4 mm.

(b) Polymerization.—Polymerization of the methacrylate ester obtained above was carried out in a manner similar to that described in Example 19 above and produced a stable aqueous emulsion of polymer.

EXAMPLE 22

Copolymerization of 3,3,4,4-tetrafluoro-4-heptafluoroisopropoxybutyl acrylate with N-methylol acrylamide Into a 100 ml., 3-neck flask were placed 1.35 grams of 3,3,4,4-tetrafluoro - 4 - heptafluoruoisopropoxybutyl acrylate, 5.5 grams of deionized water, 0.59 gram of emulsifier (prepared by mixing 6 parts of cetyl dimethylamine, 2 parts of glacial acetic acid and 24 parts water), 0.31 gram of a 60% solution of N-methylol acrylamide and 0.11 gram of 30% $H_2O_2$ solution. The mixture was flushed with nitrogen and heated to 55° C. Polymerization took place after 2 hours and a stable aqueous emulsion was obtained.

EXAMPLE 23

Polymerization of 1,1,2,2-tetrahydrododecafluoro-8-heptafluoroisopropoxyoctyl acrylate Into a 100 ml., 3-neck flask were placed 2.8 grams of 1,1,2,2 - tetrahydrododecafluoro - 8 - heptafluoroisopropoxyoctyl acrylate, 20 grams of deionized water, 1.8 grams of an emulsifier (prepared by mixing 6 parts of cetyl dimethylamine, 2 parts of glacial acetic acid and 24 parts water), and 0.6 gram of 30% $H_2O_2$ solution. The mixture was flushed with nitrogen and heated to 55° C. for a period of 6 hours. At the end of this period a charge of 0.09 gram of sodium lauryl sulfate and 0.05 gram of $K_2S_2O_8$ was added and heating was continued for 2 additional hours. The resulting solid polymer mass was further coagulated with methanol, dried under vacuum and dissolved in 1,3-bis(trifluoroethyl)benzene.

EXAMPLE 24

Copolymerization of 3,3,4,4-tetrafluoro-4-heptafluoroisopropoxybutyl acrylate with methyl methacrylate Into a 100 ml., 3-neck flask were placed 6.5 grams of 3,3,4,4-tetrafluoro-4-heptafluoroisopropoxybutyl acrylate, 0.325 gram of methyl methacrylate, 1.8 grams of cetyl dimethylammonium acetate and 0.8 gram of 30% $H_2O_2$ solution. The reaction mixture was heated to 55° C. for a period of 4 hours. A stable aqueous emulsion of polymer was obtained.

EXAMPLE 25

Copolymerization of 3,3,4,4-tetrafluoro-4-heptafluoroisopropoxybutyl acrylate with 2-ethylhexyl acrylate Into a 200 ml., 3-neck flask were placed 6.25 grams of 3,3,4,4-tetrafluoro-4-heptafluoroisopropoxybutyl acrylate, 0.325 gram of 2-ethylhexyl acrylate, 50 grams of deionized water, 1.8 grams of cetyl dimethylammonium acetate and 0.8 gram of a 30% $H_2O_2$ solution. The reaction mixture was flushed with nitrogen and heated to 55° C. for a period of 3 hours. A stable emulsion of polymer was obtained.

EXAMPLE 26

Water and oil repellency tests of acrylate and methacrylate polymers

Polymers of 3,3,4,4-tetrafluoro - 4 - (heptafluoroisopropoxy) butyl acrylate and methacrylate were evaluated as textile treating agents for use in imparting oil and water repellency to the treated textile.

Water repellencies were measured by the Spray Test Method ASTM D–583–58 wherein water is sprayed against the taut surface of the fabric test specimen under controlled conditions and produces a wetted pattern indicative of the relative repellency or resistance to external wetting of the fabric. The fabric is rated by comparing its wetted pattern with pictures on a standard rating chart.

Wash fastness of the treated cloth was determined by Method 61–1961 (Test II A) of the American Association of Textile Chemists and Colorists which method is described on pages 105–106 of the Technical Manual and Yearbook of that association for the year 1961. Conditions employed in this test give results which correlate with the results of five average, careful hand launderings at a temperature of 120° F.

The effect of repeated dry cleaning of the treated cloth was determined by Method 85–1060T of the American Association of Textile Chemists and Colorists which method is described on pages 87–88 of the Technical Manual and Yearbook of that association for the year 1961. This test is based on an extensive series of interlaboratory tests which showed there is good correlation between the test and 3 commercial dry cleanings in a 4% charged system using perchloroethylene solvent.

The procedure employed in determining the oil-repellency ratings is described, for example, on pages 323–4 of the April, 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After the 3 minute time period the wetting and penetration of the fabric is visually observed. The number corresponding to the mixture containing the highest percentage of heptane which does not penetrate or wet the fabric is considered to be the oil-repellency rating of the treated fabric.

Hydrophobic properties of the treated cloth were determined by Method 22–1961 of the American Association of Textile Chemists and Colorists which is described, for example, on pages 152–153 of the Technical Manual and Yearbook of that association for the year 1961.

Results of the tests are shown in Table I below wherein water and oil repellencies of the test fabric are shown as initially treated, and after repeated washings and dry cleanings. The fabric used was 80″ x 80″ print cotton cloth.

In preparing the samples for test the 80″ x 80″ samples of cotton print cloth were saturated in the test solutions, following which the samples were dried at 110° C. for 5 minutes, cured at 160° C. for 3 minutes and then pressed and allowed to stand for 3 minutes before testing.

The polymer test materials were applied as aqueous emulsions, as obtained by polymerizing the respective monomers by the techniques and under the conditions described herein.

TABLE I.—EVALUATION OF SUBJECT POLYMERS: WATER AND OIL REPELLENCY AND DURABILITY TO LAUNDERING AND DRY CLEANING

| Polymer | Weight loading, percent | Initial | | Number of launderings | | | | | | | | | Number of dry-cleanings | | | | | | | |
|---|---|---|---|---|---|---|---|---|---|---|---|---|---|---|---|---|---|---|---|---|
| | | | | 5 | | 10 | | 15 | | 20 | | 5 | | 10 | | 15 | | 20 | | |
| | | WR | OR | WR | OR | WR | OR | WR | OR | WR | OR | WR | OR | WR | OR | WR | OR | WR | OR | |
| A | 6.9 | 50 | 100 | 0 | 90 | 0 | 80 | 0 | 80 | 0 | 70 | 50 | 90 | 0 | 90 | 0 | 90 | 0 | 80 | |
| B | 5.7 | 50 | 100 | 50 | 100 | 25 | 90 | 0 | 80 | 0 | 80 | 50 | 100 | 50 | 90 | 0 | 90 | 0 | 80 | |
| C | 4.6 | 50 | 100 | 50 | 100 | 0 | 90 | 0 | 80 | 0 | 70 | 50 | 90 | 0 | 90 | 0 | 80 | 0 | 80 | |
| D | 3.8 | 70 | 120 | | | | | | | | | | | | | | | | | |
| E | 2.0 | 70 | 130 | | | | | | | | | | | | | | | | | |
| F | 0.60 | 80 | 100 | | | | | | | | | | | | | | | | | |
| G | 0.70 | 80 | 110 | | | | | | | | | | | | | | | | | |

WR = water repellency; OR = oil repellency.

$A = (CF_3)_2CFOCF_2CF_2CH_2CH_2OCO[CH-CH_2]_n$;

$B = (CF_3)_2CFOCF_2CF_2CH_2CH_2OCO[C(CH_3)-CH_2]_n$.

$C = (CF_3)_2CFOCF_2CF_2CH_2CH_2OCO[CH-CH_2]_n$ and N-methylol Acrylamide Co-polymer.

$D = (CF_3)_2CFOCF_2CF_2CF_2CF_2CH_2CH_2OCO[C(CH_3)-CH_2]_n$.

$E = (CF_3)_2CFOCF_2CF_2(CF_2CF_2)_4CH_2CH_2OCO[CH-CH_2]_n$.

$F = (CF_3)_2CFOCF_2CF_2CH_2CH_2OCO[CH-CH_2]_n$ and methyl methacrylate copolymer.

$G = (CF_3)_2CFOCF_2CF_2CH_2CH_2OCO[CH-CH_2]_n$ and 2-ethylhexyl acrylate copolymer.

Since various changes and modifications may be made in the invention without departing from the spirit thereof, it is intended that all matter contained in the above description shall be interpreted as illustrative and not in a limiting sense.

We claim:

1. Compounds having the formula:

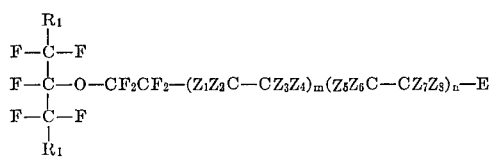

wherein:
(a) $R_1$ are independently F or haloalkyl groups, or when taken together, are haloalkylene groups forming a cycloaliphatic structure, which $R_1$ groups may each have from 1 to 9 carbon atoms and which halogen atoms, if any, have an atomic weight not exceeding about 79.92,
(b) $Z_1$, $Z_2$, $Z_3$, $Z_4$, $Z_5$, $Z_6$, $Z_7$ and $Z_8$ are independently selected from the group consisting of H and F,
(c) $m$ is an integer of from 1–75,
(d) $n$ is an integer of from 0–75, and
(e) E is a hologen atom selected from the group consisting of I and Br.

2. Compounds as defined in claim 1 wherein the $R_1$ groups are haloalkyl groups.
3. Compounds as defined in claim 1 wherein E is I.
4. Compounds as defined in claim 1 wherein the $R_1$ groups are each perfluoroalkyl groups.
5. Compounds as defined in claim 1 wherein the $R_1$ groups are each F.
6. Compounds as defined in claim 5, wherein E is I.
7. Compounds as defined in claim 6, wherein $m$ is from 1–40 and $n$ is from 0–40.
8. Compounds as defined in claim 7, wherein $m$ is 1–10.
9. Compounds as defined in claim 6 in which $m$ is 1–7 and $n$ is 1–7.
10. Compounds as defined in claim 9, wherein the $-Z_1Z_2C-CZ_3Z_4-$ and $-Z_5Z_6C-CZ_7Z_8-$ moieties are independently selected from the following: $-CF_2CF_2-$, $-CF_2CH_2-$, and $-CH_2CH_2-$.
11. Compounds as defined in claim 10, wherein the $-Z_1Z_2C-CZ_3Z_4-$ and $-Z_5Z_6C-CZ_7Z_8-$ moieties are independently $-CF_2CF_2-$.
12. Compounds as defined in claim 10 wherein $$-(Z_1Z_2C-CZ_3Z_4)_m-$$

is $-(CF_2CH_2)_m-$.

13. Compounds as defined in claim 10, wherein $-(Z_1Z_2C-CZ_3Z_4)_m$ is $-(CH_2CH_2)_m$.
14. Compounds as defined in claim 1, wherein the $-(Z_1Z_2C-CZ_3Z_4)_m-$ moiety is $(CF_2CF_2)-$ and wherein the $-(Z_5Z_6C-CZ_7Z_8)_n-$ moiety is $(CH_2CH_2)_m$.
15. Compounds as defined in claim 14, wherein $R_1$ is haloalkyl groups.
16. Compounds as defined in claim 14, wherein E is I.
17. Compounds as defined in claim 14, wherein $R_1$ is perfluoroalkyl groups.
18. Compounds as defined in claim 14 which are:

$(CF_3)_2CFOCF_2CF_2(CF_2CF_2)_mI$ wherein $m$ is 1–7.

19. Compounds as defined in claim 14 which are:

$(CF_3)_2CFOCF_2CF_2(CH_2CH_2)_mI$ wherein $m$ is 1–3.

20. A compound as defined in claim 14 which is:

$(CF_3)_2CFOCF_2CF_2CF_2CH_2I$

21. A compound as defined in claim 14 which is:

$(CF_3)_2CFOCF_2CF_2CF_2CF_2CH_2CH_2I$

22. A compound as defined in claim 14 which is:

$(CF_3)_2CFOCF_2CF_2(CF_2CF_2)_3CH_2CH_2I$

23. Compounds as defined in claim 14, wherein $R_1$ is F.
24. Compounds as defined in claim 23, wherein E is I.
25. Compounds as defined in claim 24, wherein $m$ is from 1–40 and wherein $n$ is from 0–40.
26. Compounds as defined in claim 25, wherein $m$ is from 1–10.
27. Compounds as defined in claim 25, wherein $m$ is from 1–7 and $n$ is from 1–7.
28. A compound as defined in claim 14 which is $(CF_3)_2CFOCF_2CF_2CF_2CF_2I$ 29. A compound as defined in claim 14 which is $(CF_3)_2CFOCF_2CF_2CH_2CH_2I$ 30. A compound as defined in claim 14 which is $(CF_3)_2CFOCF_2CF_2CF_2CF_2CF_2CF_2CH_2CH_2I$ 31. A compound as defined in claim 14 which is $(CF_3)_2CFOCF_2CF_2CH_2CH_2CH_2CH_2I$

References Cited

UNITED STATES PATENTS

| | | |
|---|---|---|
| 3,083,238 | 3/1963 | Hauptschein et al. |
| 3,129,248 | 4/1964 | England. |
| 3,145,222 | 8/1964 | Brace _____ 260—408 |
| 3,274,239 | 9/1966 | Selman. |
| 3,331,813 | 7/1967 | Pittman et al. |
| 3,382,222 | 5/1968 | Pittman et al. |
| 3,384,628 | 5/1968 | Pittman et al. |

LEON ZITVER, Primary Examiner

H. T. MARS, Assistant Examiner

U.S. Cl. X.R.

106—2; 117—139.5, 145; 252—54, 65, 67, 77, 351; 260—86.1, 89.5, 408, 458, 526, 531, 535, 543, 544, 611, 633, 999

UNITED STATES PATENT OFFICE
CERTIFICATE OF CORRECTION

Patent No. 3,514,487            Dated    May 26, 1970

Inventor(s) Louis G. Anello, Richard F. Sweeney, Morton H. Litt

It is certified that error appears in the above-identified patent and that said Letters Patent are hereby corrected as shown below:

Column 5, line 51, "generally" should be --generating-- line 72, "weights" should be --weight--

Column 12, line 46, --,-- should be inserted after last formula

Column 15, line 2, "F, 61.8" should read --F, 61.38--

Column 24, line 4, "Tihs" should be --This--

Column 25, line 12, "hologen" should be --halogen-- line 40, "$-(Z_1Z_2C-CZ_3Z_4)_m$" should be -- $-(Z_1Z_2C-CZ_3Z_4)_m-$ -- line 40, "$-(CH_2CH_2)_m$" should be -- $-(CH_2CH_2)_m-$ -- line 42, "$(CF_2CF_2)-$" should be -- $-(CF_2CF_2)_m-$ -- line 43, "$(CH_2CH_2)_m$" should be -- $-(CH_2CH_2)_m-$ -- line 47, "is" should be --are--

Signed and sealed this 1st day of June 1971.

(SEAL)
Attest:

EDWARD M. FLETCHER, JR.          WILLIAM E. SCHUYLER, JR.
Attesting Officer                   Commissioner of Patents